US007805602B1

(12) United States Patent
Karpati et al.

(10) Patent No.: US 7,805,602 B1
(45) Date of Patent: Sep. 28, 2010

(54) PRIORITIZED CALL ADMISSION CONTROL FOR INTERNET KEY EXCHANGE

(75) Inventors: Danny Karpati, Netanya (IL); Alon Zilberman, Givat Shmuel (IL); Ido Halevi, Givat Ada (IL)

(73) Assignee: Cisco Technology, Inc., San Jose, CA (US)

( * ) Notice: Subject to any disclaimer, the term of this patent is extended or adjusted under 35 U.S.C. 154(b) by 1239 days.

(21) Appl. No.: 11/271,321

(22) Filed: Nov. 10, 2005

(51) Int. Cl.
*H04L 29/00* (2006.01)

(52) U.S. Cl. ............ 713/150; 713/154; 713/160; 713/166; 726/13; 726/15

(58) Field of Classification Search .......... 713/150, 713/154, 160, 166; 726/13, 15
See application file for complete search history.

(56) References Cited

U.S. PATENT DOCUMENTS

| 5,611,049 | A | 3/1997 | Pitts |
| 5,926,834 | A | 7/1999 | Carlson et al. |
| 5,987,506 | A | 11/1999 | Carter et al. |
| 6,032,216 | A | 2/2000 | Schmuck et al. |
| 6,085,234 | A | 7/2000 | Pitts et al. |
| 6,119,151 | A | 9/2000 | Cantrell et al. |
| 6,195,650 | B1 | 2/2001 | Gaither et al. |
| 6,330,562 | B1 * | 12/2001 | Boden et al. ............ 1/1 |
| 6,356,863 | B1 | 3/2002 | Sayle |
| 6,574,618 | B2 | 6/2003 | Eylon et al. |
| 6,718,372 | B1 | 4/2004 | Bober |
| 6,748,502 | B2 | 6/2004 | Watanabe et al. |
| 6,823,462 | B1 * | 11/2004 | Cheng et al. .......... 726/15 |
| 7,218,722 | B1 * | 5/2007 | Turner et al. .......... 379/221.02 |
| 2004/0210604 | A1 | 10/2004 | Li et al. |
| 2004/0242229 | A1 * | 12/2004 | Okazaki ............ 455/432.1 |
| 2006/0187942 | A1 * | 8/2006 | Mizutani et al. ...... 370/401 |

OTHER PUBLICATIONS

Rigney, et al., "Remote Authentication Dial-in User Service (RADIUS)", published as RFC 2865, Jun. 2000.
Blunk and Vollbrecht, "PPP Extensible Authentication Protocol (EAP)", published as IETF RFC 2284, Mar. 1998.
Page, et al., "Perspectives on optimistically replicated, peer-to-peer filing", Software: Practice and Experience 28(2), 1998, pp. 155-180.
Guy, et al., "Implementation of the ficus replicated file system", Proceedings of the Summer USENIX Conference (Anaheim, CA, Jun. 1990), pp. 63-71.
Pawlowski, et al., "The NFS Version 4 Protocol", published at the System Administration and Networking (SANE) Conference (May 22-25, 2000 MECC, Maastricht, The Netherlands).

(Continued)

*Primary Examiner*—Carl Colin
(74) *Attorney, Agent, or Firm*—Abelman, Frayne & Schwab

(57) ABSTRACT

A method for communication includes predefining two or more client profiles applicable to clients of a communication network. Virtual Private Network (VPN) connections are initiated between at least two of the clients and the network. At least two of the clients are matched with respective profiles selected from the two or more predefined client profiles. Priorities are assigned to packets exchanged between the at least two of the clients and the network responsively to the profiles. The VPN connections are set up for the at least two of the clients responsively to the priorities.

28 Claims, 2 Drawing Sheets

OTHER PUBLICATIONS

Braam, et al., "Removing bottlenecks in distributed filesystems: Coda and Intermezzo as examples", published in the proceedings of Linux Expo 1999 (May 1999).

D. Maughan et al., "Internet Security Association and Key Management Protocol (ISAKMP)", published as RFC 2408, (Nov. 1998).

D. Harkins et al., "The Internet Key Exchange (IKE)", published as RFC 2409, (Nov. 1998).

S. Kent et al., "Security Architecture for the Internet Protocol", published as RFC 2401, (Nov. 1998).

Kent and Atkinson, "Security Architecture for the Internet Protocol", published as RFC 2401, Nov. 1998.

Harkins and Carrel, "The Internet Key Exchange", IETF RFC 2409, Nov. 1998.

Maughan, Internet security Association and Key Management Protocol (ISAKMP), IETF RFC 2408, Nov. 1998.

* cited by examiner

PRIORITIZED CALL ADMISSION CONTROL FOR INTERNET KEY EXCHANGE

FIELD OF THE INVENTION

The present invention relates generally to computer networks, and particularly to methods and systems for prioritizing the setting up of Virtual Private Network (VPN) connections over communication networks.

BACKGROUND OF THE INVENTION

Many organizations use Virtual Private Networks (VPNs) to connect users and remote sites securely to their corporate network. VPNs over Internet Protocol (IP) networks often use the IP security (IPsec) protocol suite, which provides a set of cryptographically-based security services. The IPsec architecture is described by Kent and Atkinson in "Security Architecture for the Internet Protocol," published as Request for Comments 2401 by the Internet Engineering Task Force (IETF RFC 2401), November 1998, which is incorporated herein by reference.

Internet key exchange (IKE) is a sub-protocol of IPsec that authenticates each peer in an IPsec transaction, negotiates security policy and handles the exchange of encryption keys. IKE is described by Harkins and Carrel in "The Internet Key Exchange," IETF RFC 2409, November 1998, which is incorporated herein by reference.

The Internet Security Association and Key Management Protocol (ISAKMP) is a protocol that is part of IKE. ISAKMP defines procedures and packet formats for establishing, negotiating, modifying and deleting security associations (SA) between peers. ISAKMP is defined by Maughan, et al., in "Internet Security Association and Key Management Protocol (ISAKMP)," IETF RFC 2408, November 1998, which is incorporated herein by reference.

The present invention will be more fully understood from the following detailed description of the embodiments thereof, taken together with the drawings in which:

DETAILED DESCRIPTION OF EMBODIMENTS

System Description

Figure 1:
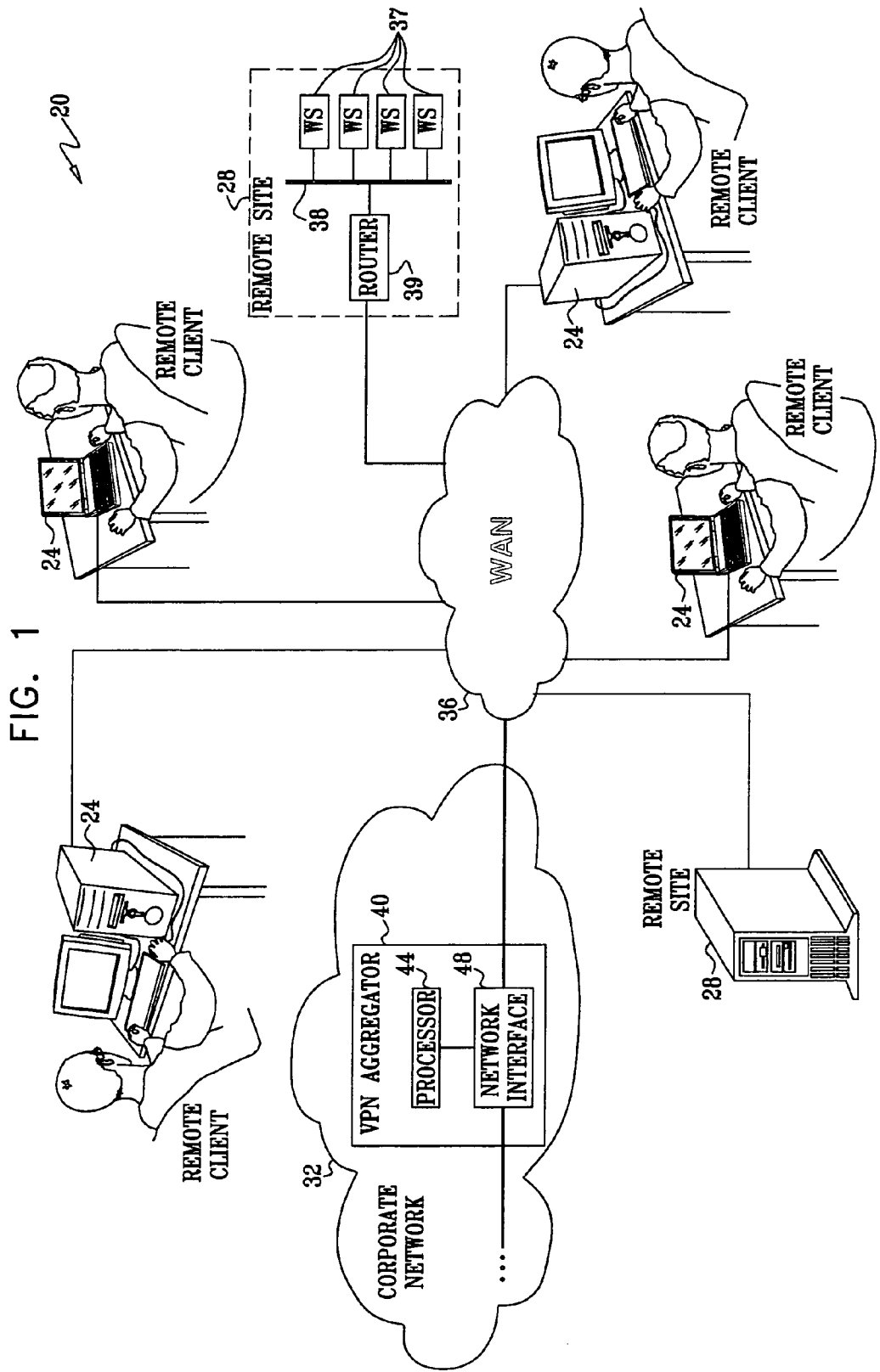
FIG. 1 is a block diagram that schematically illustrates a computer network, in accordance with an embodiment of the present invention.

FIG. 1 is a block diagram that schematically illustrates a computer network 20, in accordance with an embodiment of the present invention. Network 20 comprises multiple remote clients 24 and remote sites 28 that connect to a corporate network 32 via a wide-area network (WAN) 36, such as the Internet. Corporate network 32 typically belongs to an organization having employees and/or customers that need to remotely connect to the organizational network. Remote clients 24 may comprise, for example, employees working from home and traveling users connecting to the network from hotel rooms or via wireless hotspots. Remote sites 28 may comprise, for example, branch offices located away from the corporate headquarters and customers or suppliers that are granted access to certain services of the corporate network. In some embodiments typical of remote branch offices, remote site 28 comprises a number of personal computers or workstations 37 connected by a local area network (LAN) 38. LAN 38 is connected to WAN 36 using a router 39. (In the description that follows, remote clients and remote sites are collectively referred to as "clients" for the sake of simplicity.)

In many applications it is desirable to maintain a high level of information security when communicating over WAN 36. For this purpose, clients 24 and sites 28 are connected to network 32 using Virtual Private Network (VPN) connections, also referred to as VPN tunnels. Each client establishes a secure VPN tunnel to corporate network 32 via a VPN aggregator 40. In particular, aggregator 40 prioritizes the setting up of VPN tunnels for different client types based on predefined client profiles, as will be explained in detail below. In some embodiments, aggregator 40 may prioritize and set up VPN tunnels for any or all of the clients of network 32.

Some exemplary VPN aggregators that can use the prioritization methods described herein are the VPN 3000 series concentrators produced by Cisco Systems, Inc. (San Jose, Calif.).

Each VPN tunnel generally uses a secure communication protocol between the client and the VPN aggregator. The protocol typically uses mutually-agreed encryption keys to encrypt and decrypt the information being transferred. In some embodiments, networks 32 and comprise Internet Protocol (IP) networks that communicate by exchanging IP packets. In these embodiments, the exchange of packets within and between these networks is performed in accordance with the IPsec and IKE protocols, as defined and described in the IETF RFCs cited above.

The network configuration shown in FIG. 1 is an exemplary configuration chosen purely for the sake of conceptual clarity. In general, network 20 may comprise any number of remote clients and/or remote sites. Remote clients and sites may be connected to WAN 36 using any suitable wired or wireless links. Aggregator 40 may comprise any network element, which may serve as the gateway connecting corporate network 32 to WAN 36, or may be part of any other suitable configuration that connects the two networks. Corporate network 32 may comprise a private network or be implemented as part of a shared public network whose services are provided by a service provider.

Although the embodiments described herein mainly relate to a "responder mode" in which the clients initiate the setting up of VPN tunnels with network 32, the methods and systems described herein can be used, mutatis mutandis, in an "initiator mode" in which aggregator 40 initiates the setting up of the VPN tunnels.

Aggregator 40 comprises an aggregation processor 44, which performs the various functions associated with setting up and managing the VPN tunnels, and a network interface 48, for communicating with WAN 36 and with the different components of corporate network 32. Typically, processor 44 of aggregator 40 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, processor 44 may be implemented using a combination of hardware and software elements. The processor may be a standalone unit, or it may alternatively be integrated with other computing platforms of corporate network 32.

Typically, a newly-joining client sends an IKE request packet to the VPN aggregator, requesting to set up a VPN connection (tunnel) to network 32. The VPN aggregator receives the request packet and performs a tunnel setup process that authenticates the client and exchanges encryption keys. In many cases, the IKE process of setting up a VPN tunnel for a newly-joining client is a long and computation-intensive process that consumes a significant amount of time and computation resources in aggregator 40. The length and complexity of this process are partly due to the algebraic calculations associated with generating the encryption keys. In some cases, aggregator 40 may need to communicate with other nodes in network 32 in order to authenticate a particular client, which further lengthens the tunnel setup process.

In some applications, aggregator 40 supports many thousands of clients simultaneously. In peak periods (such as at the beginning of a working day), several hundred clients may request to set up VPN tunnels every second. Due to the finite resources of the aggregator, some of these clients may experience a noticeable delay in setting up their VPN tunnels. An extreme scenario occurs when parts of the network, or aggregator 40 itself, recover from a communication failure that affects a large number of clients. When the network recovers, thousands of clients may request to set up VPN tunnels simultaneously. In such a scenario, some of these clients may suffer significant delays of up to several minutes in establishing their VPN connections. Clearly, such delays may be considered a prohibitive and intolerable quality of service (QoS) flaw by some clients and applications.

Some VPN applications use a Call Admission Control (CAC) mechanism, which limits the rate of tunnel setup request packets being processed in order to protect the resources of the aggregator. Typically, when the aggregator resource utilization exceeds a predetermined threshold, the CAC process prevents subsequent request packets from being processed. For example, in some embodiments the CAC process measures the aggregator processor utilization (i.e., the percentage of CPU resources used). If the processor utilization crosses a predetermined threshold, the CAC process rejects subsequent request packets. Because of the computational complexity of the tunnel setup process, the CAC process often gives higher priority to requests whose processing has already begun and may reject new requests.

In view of the long setup delays that may be experienced by clients, it is sometimes desirable to assign priorities to the setup request packets based on a classification of the clients. For example, in some networks it is desirable to give remote sites (e.g., branch offices) priority over individual remote clients. As another example, some remote clients may be classified as senior employees or as premium customers that are offered higher service quality. In other cases, it is desirable to give higher priority to VPN tunnels that use voice services or to tunnels used for network control. Request packets from clients having higher priority should be handled first by the aggregator, thereby shortening the connection delay for these clients.

Existing QoS mechanisms, such as the Modular QoS Command line interface (MQC) provided by Cisco Systems, Inc. (San Jose, Calif.), are generally unsuitable for prioritizing IKE request packets. Since the majority of IKE-related information is encrypted, such QoS mechanisms are generally unable to process and prioritize IKE packets.

Prioritization Method Description

In order to provide a faster connection time and an overall better QoS to selected client types, embodiments of the present invention provide methods and systems for prioritizing the setting-up of VPN tunnels based on client profiles.

Figure 2:
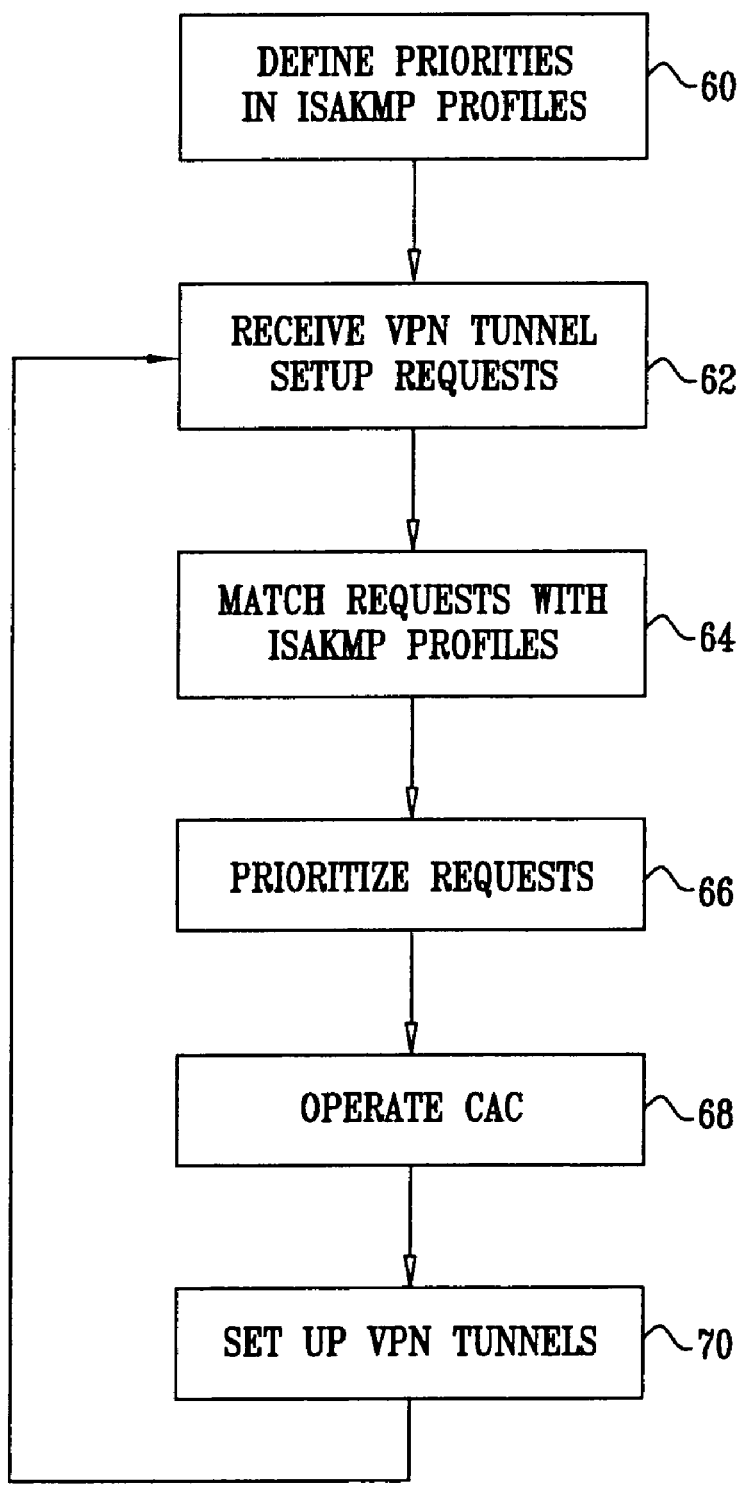
FIG. 2 is a flow chart that schematically illustrates a method for prioritizing VPN tunnel setup requests, in accordance with an embodiment of the present invention.

FIG. 2 is a flow chart that schematically illustrates a method for prioritizing VPN tunnel setup requests, carried out by VPN aggregator 40 in accordance with an embodiment of the present invention. The method begins with an operator, such as a system administrator, defining a configuration of two or more client profiles, at a profile definition step 60. Each client profile defines the client's association with certain predetermined client categories. A client category may comprise, for example, branch offices or other remote sites. Other client categories may comprise, for example, senior employees or premium customers. In general, the configuration of client profiles is arranged so that every client is associated with no more than a single profile.

As part of the profile definition, each client category is assigned a priority level. Typically, the priority level is represented as a number selected from a predetermined range.

In some VPN applications, the VPN aggregator maintains a set of ISAKMP profiles as part of the ISAKMP process. The ISAKMP profiles are used, for example, for identity matching, certificate filtering, authentication, authorization and virtual routing and forwarding (VRF). In some embodiments of the present invention, the ISAKMP profiles are adapted to serve as client profiles for prioritizing the VPN tunnel setup requests. For this purpose, an additional "priority" command is added to the ISAKMP profile. The following code shows an exemplary configuration comprising three adapted ISAKMP profiles:

```
crypto isakmp profile cisco
vrf cisco
match identity group cisco-vpncluster
match identity user JohnChambers
   priority 1
match identity group cisco-engineers
   priority 2
match identity group cisco-sales
   priority 3
match certificate group cisco-ca
keying cisco-keyring
client authentication list cisco-client
isakmp authorization list global-aaa
priority 1
crypto isakmp profile company-A
vrf cmp-A
match identity group cmp-A-vpncluster
match certificate group cmp-A-ca
keying cmp-A-keyring
client authentication list cmp-A-client
isakmp authorization list global-aaa
priority 2
crypto isakmp profile company-B
vrf cmp-B
match identity group cmp-B-vpncluster
match certificate group cmp-B-ca
keying cmp-B-keyring
client authentication list amp-B-client
isakmp authorization list global-aaa
priority 2
```

Each ISAKMP profile comprises one or more "match identity" commands, identifying client categories such as client groups or individual clients. In some embodiments, when a "priority" command is added below a certain "match identity" command, the aggregator assigns the priority level specified in this command to this category. When a single "priority" command is added to the entire ISAKMP profile, this priority level applies to all "match identity" commands in this profile. (See, for example, the "company-A" and "company-B" profiles above.)

Having defined the client profiles, the profiles are provided to aggregator 40. In some embodiments, the configuration of client profiles can be modified and updated whenever necessary during operation.

Aggregator 40 receives IKE VPN tunnel setup request packets (referred to as request packets for brevity) from clients of corporate network 32, at a request reception step 62. According to the IKE protocol, each request packet comprises an identification (ID) payload, which identifies the client sending the packet.

Aggregator 40 matches each VPN request packet with one of the client profiles, at a matching step 64. In some embodiments, the aggregator extracts the ID payload from the request packet and attempts to match it against the different "match identity" commands in the ISAKMP profiles. If a matching "match identity" command is found, the aggregator reads the priority level assigned to this category from the client profile and assigns the priority level to the request packet. In some embodiments, if a match is not found, the request packet is assigned a default priority level, such as the lowest priority level. Alternatively, the request packet may be dropped.

Aggregator 40 prioritizes the request packets, at a prioritization step 66. In some embodiments, aggregator uses the priority levels assigned to each request packet at step 64 above to prioritize the handling of the packets. Typically, request packets having the same priority level are handled on a "first come, first served" basis, although any other criterion can be used for this purpose.

In some embodiments, aggregator 40 operates a prioritized Call Admission Control (CAC) mechanism responsively to the assigned priorities, at a CAC operation step 68. For example, the CAC mechanism may operate several queues, each queue associated with a particular priority level. After assigning priorities to the request packets, the aggregator adds each request packet to the queue associated with the priority of this packet. The queues are then served, typically giving more weight to queues associated with higher priority levels. Any suitable scheduling method known in the art, such as Modified Deficit Round Robin (MDRR), can be used for this purpose. As noted above, the CAC mechanism is used to protect the aggregator resources, typically by rejecting pending request packets when the aggregator utilization exceeds a predetermined threshold. However, when using the CAC mechanism described above, high priority requests are served first and are unlikely to be rejected.

Aggregator 40 sets up VPN tunnels according to the prioritized order of the request packets, at a tunnel setup step 70. The method then returns to request reception step 62 above for receiving subsequent request packets.

In some embodiments, aggregator 40 may assign priorities to clients responsively to measured traffic characteristics of the clients. For example, the aggregator may measure the volume of traffic (e.g. the average packet rate) originating from each client and assign a higher priority to high traffic clients. As another example, the aggregator may identify service types used by clients, and give a higher priority to clients who frequently use a certain service type (e.g. voice). Any other suitable traffic characteristic or combination of characteristics can be used for this purpose. The measurement of the traffic characteristics and the assignment of priorities based on these characteristics may be performed during a learning period and/or during normal operation of the network. The process may be fully-automated or may involve a human operator, for example for verifying the automated assignments, for reviewing measured characteristics or for manually assigning priorities to automatically measured traffic characteristics.

Although the embodiments described herein relate mainly to prioritizing IKE VPN tunnel setup requests, the principles of the present invention can also be used in other tunnel-based protocols that use aggregators, such as PPP, L2TP, SSH and SSL.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for prioritizing the setup of a plurality of connections in a Virtual Private Network (VPN) serving a plurality of clients, the method comprising:
providing an aggregation processor operative to perform functions associated with setting up and managing the connections;
predefining at least two Internet Security Association and Key Management Protocol (ISAKMP) client profiles for the VPN, wherein each ISAKMP client profile defines an association with a respective predetermined client category via an ISAKMP match identity command;
adding a priority command to the ISAKMP client profiles, the priority commands indicating a plurality of different priorities;
initiating, by the aggregation processor, connections in the VPN for at least two clients;
matching, by the aggregation processor, the at least two clients with respective profiles selected from the at least two ISAKMP predefined client profiles;
setting up, by the aggregation processor, the VPN connections for the at least two clients according to the priorities of the predefined ISAKMP client profiles.

2. The method according to claim 1, wherein initiating the VPN connections comprises receiving at least one request packet from each of the at least two clients to set up the VPN connections.

3. The method according to claim 2, wherein, for each of the at least one request packet, receiving the request packet comprises extracting an identification (ID) payload carried in the packet, and wherein matching the clients comprises mapping the ID payload to one of the at least two predefined ISAKMP client profiles.

4. The method according to claim 1, wherein initiating the VPN connections comprises exchanging Internet Key Exchange (IKE) packets, and wherein setting up a VPN connection comprises establishing the connections using an IKE protocol.

5. The method according to claim 1, wherein setting up the VPN connections comprises connecting the at least two clients to the network over a wide-area network (WAN).

6. The method according to claim 1, wherein setting up the VPN connections comprises connecting at least one remote site to the network.

7. The method according to claim 1, wherein predefining the at least two client profiles comprises defining at least one category, each applicable to at least one client, and defining the priorities of the categories.

8. The method according to claim 1, wherein initiating the VPN connections comprises measuring a resource utilization of a processor carrying out the method and refraining from setting up at least one VPN connection responsively to the priorities when a crossing of a threshold of the resource utilization occurs.

9. The method according to claim 1, wherein assigning the priorities comprises measuring a traffic characteristic of packets exchanged between the at least two clients and the VPN and determining the priorities responsively to the measured traffic characteristic.

10. Apparatus for prioritizing the setup of a plurality of connections in a Virtual Private Network (VPN) serving a plurality of clients, the apparatus comprising:
a network interface arranged to communicate with the clients; and
an aggregation processor coupled to the network interface and arranged:
to accept definitions of at least two Internet Security Association and Key Management Protocol (ISAKMP) client profiles for the VPN, wherein each ISAKMP client profile defines an association with a respective predetermined client category via an ISAKMP match identity command, and wherein the ISAKMP client profiles are modified to contain priority commands indicating a plurality of different priorities;
to initiate connections for a client in the VPN;
to match a client to a profile selected from the at least two ISAKMP client profiles;
to assign a priority to a packet from the client responsively to the profile; and
to set up a VPN connection for the client responsively to the priority.

11. The apparatus according to claim 10, wherein the processor and network interface are arranged to receive a request packet from a client to set up a VPN connection.

12. The apparatus according to claim 11, wherein, for the request packet, the processor is arranged to extract an identification (ID) payload carried in the packet and to map the ID payload to an ISAKMP client profile.

13. The apparatus according to claim 10, wherein the processor and the network interface are arranged to send and receive Internet Key Exchange (IKE) packets and to establish a VPN connection using an IKE protocol.

14. The apparatus according to claim 10, wherein at least one of the clients communicates with the network over a wide-area network (WAN).

15. The apparatus according to claim 10, wherein at least one of the clients comprises a remote site of the network.

16. The apparatus according to claim 10, wherein the client profiles define one or more categories, each applicable to at least one client, and wherein the priorities define a priority relationship among the one or more categories.

17. The apparatus according to claim 10, wherein the processor is arranged to measure a resource utilization of the processor and to refrain from setting up at least one VPN connection responsively to the priorities when a crossing of a threshold of the resource utilization occurs.

18. The apparatus according to claim 10, wherein the processor is arranged to measure a traffic characteristic of the packets exchanged between the at least two of the clients and the network and to determine the priorities responsively to the measured traffic characteristic.

19. An apparatus for prioritizing the setup of a plurality of connections in a Virtual Private Network (VPN) serving a plurality of clients, the apparatus comprising:
means for predefining at least two Internet Security Association and Key Management Protocol (ISAKMP) client profiles for the VPN, wherein each ISAKMP client profile defines an association with a respective predetermined client category via an ISAKMP match identity command;
means for adding a priority command to the ISAKMP client profiles, the priority commands indicating a plurality of different priorities;
means for initiating connections in the VPN for at least two clients;
means for matching the at least two clients with respective profiles selected from the at least two predefined ISAKMP client profiles;
means for setting up the VPN connections for the at least two clients according to the priorities of the predefined ISAKMP client profiles.

20. A computer software product for prioritizing the setup of a plurality of connections in a Virtual Private Network (VPN) serving a plurality of clients, the product comprising a computer-readable medium in which program instructions are stored, which instructions, when executed by a processor, cause the processor:
to accept a definition of at least two Internet Security Association and Key Management Protocol (ISAKMP) client profiles for the VPN, wherein each ISAKMP client profile defines an association with a respective predetermined client category via an ISAKMP match identity command, the ISAKMP client profiles modified to contain priority commands indicating a plurality of different priorities;
to initiate connections for a client in the VPN;
to match a client to a profile selected from the at least two ISAKMP client profiles;
to assign a priority to a packet from the client responsively to the ISAKMP client profile; and
to set up a VPN connection for the client responsively to the priority.

21. The product according to claim 20, wherein the instructions cause the processor to receive a request packet from a client to set up a VPN connection.

22. The product according to claim 21, wherein, for the request packet, the processor is arranged to extract an identification (ID) payload carried in the packet and to map the ID payload to an ISAKMP client profile.

23. The product according to claim 20, wherein the instructions cause the processor to send and receive Internet Key Exchange (IKE) packets and to establish a VPN connection using an IKE protocol.

24. The product according to claim 20, wherein at least one of the clients communicates with the network over a wide-area network (WAN).

25. The product according to claim 20, wherein at least one of the clients comprises a remote site of the network.

26. The product according to claim 20, wherein the client profiles define one or more categories, each applicable to at least one of the clients, and wherein the priorities define a priority relationship among the one or more categories.

27. The product according to claim 20, wherein the instructions cause the processor to measure a resource utilization of at least one of the one or more processors and to refrain from setting up at least one VPN connection responsively to the priorities when a crossing of a threshold of the resource utilization occurs.

28. The product according to claim 20, wherein the instructions cause the processor to measure a traffic characteristic of the packets exchanged between the at least two of the clients and the network and to determine the priorities responsively to the measured traffic characteristic.

* * * * *